(12) United States Patent
Stephen et al.

(10) Patent No.: US 6,363,926 B1
(45) Date of Patent: Apr. 2, 2002

(54) HANDLE FOR A BARBECUE GRILL

(75) Inventors: Robert T. Stephen; Erich J. Schlosser, both of Barrington; J. Michael Alden, Palatine; Mohammed Shoeb, Hoffman Estate; Dugan O'Keene, Oak Park, all of IL (US)

(73) Assignee: Weber-Stephen Products Co., Palatine, IL (US)

( * ) Notice: Subject to any disclaimer, the term of this patent is extended or adjusted under 35 U.S.C. 154(b) by 0 days.

(21) Appl. No.: 09/374,822

(22) Filed: Aug. 13, 1999

(51) Int. Cl.[7] .......................... A47J 37/00; A47B 95/02
(52) U.S. Cl. ..................... 126/41 R; 126/25 R; 16/422; 16/436; 16/443
(58) Field of Search ............................... 126/190, 41 R, 126/9 R, 25 R, 39 R; 16/116 R, 111 R, 114 A, DIG. 24, DIG. 40, 436, 431, 443, 422, 110.1; D8/300; 292/353; 220/755, 759, 753; 401/3

(56) References Cited

U.S. PATENT DOCUMENTS

| | | | | | |
|---|---|---|---|---|---|
| 434,295 | A | * | 8/1890 | Richardi | 292/353 |
| 841,364 | A | * | 1/1907 | Wickwar | 16/422 |
| 1,235,309 | A | * | 7/1917 | Garretson | 16/431 |
| 1,501,480 | A | * | 7/1924 | Dye | 16/114 R |
| 1,942,493 | A | * | 1/1934 | Reith | 16/116 R |
| 2,237,289 | A | * | 4/1941 | Buck et al. | 16/DIG. 24 |
| 2,494,159 | A | * | 1/1950 | Bernstein | 220/759 |
| 2,635,280 | A | * | 4/1953 | Baca | 16/116 R |
| 3,542,009 | A | * | 11/1970 | Warner | 126/25 R |
| 3,878,584 | A | * | 4/1975 | Witte | 16/116 R |
| 3,920,147 | A | | 11/1975 | Hiatt | |
| 4,197,611 | A | * | 4/1980 | Bell et al. | 16/116 R |
| 4,209,877 | A | * | 7/1980 | Colasent | 16/116 R |
| 4,638,529 | A | * | 1/1987 | Katona | 16/DIG. 24 |
| 4,989,579 | A | | 2/1991 | Murphy et al. | |
| 5,080,313 | A | | 1/1992 | Byrum et al. | |
| 5,088,069 | A | * | 2/1992 | Koziol | 126/25 R |
| 5,353,475 | A | * | 10/1994 | Fischbach | 16/DIG. 24 |
| 5,558,570 | A | * | 9/1996 | Nakamura et al. | 16/DIG. 24 |
| 5,560,081 | A | * | 10/1996 | Yen | 16/DIG. 24 |
| 5,575,516 | A | * | 11/1996 | Baumgarten | 292/353 |
| 5,666,941 | A | * | 9/1997 | Teufel et al. | 126/41 R |
| 5,771,536 | A | * | 6/1998 | Sieg et al. | 16/114 R |
| 5,815,875 | A | * | 10/1998 | Yamada | 15/167.1 |

* cited by examiner

Primary Examiner—James C. Yeung
(74) Attorney, Agent, or Firm—Wallenstein & Wagner, Ltd.

(57) ABSTRACT

A handle (28) for a grill (10) has a gripping portion (34). The gripping portion (34) defines an inner chamber (31) therein. The gripping portion (34) has a passageway (52) in fluid communication with the inner chamber (31) and the atmosphere. The handle (28) is adapted to be connected to a lid (18) of the grill (10). The lid (18) has a support member (20) having a sleeve (24). The sleeve (24) has an inner wall (64) having an inner surface (66). The gripping portion (34) has an end (38) and an expansion member (42) connected to the end (38). The expansion member (42) is adapted to be received by the sleeve (24). The expansion member (42) has an expansion wall (72) having an outer surface (80) wherein the expansion wall (72) is adapted to be expanded outwardly wherein the outer surface (80) of the expansion wall (72) engages the inner surface (66) of the sleeve (24).

10 Claims, 3 Drawing Sheets

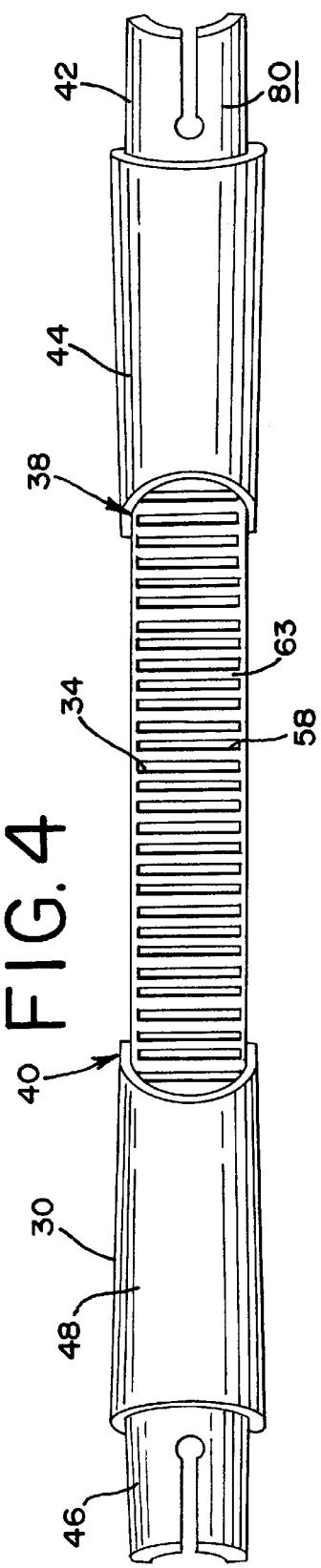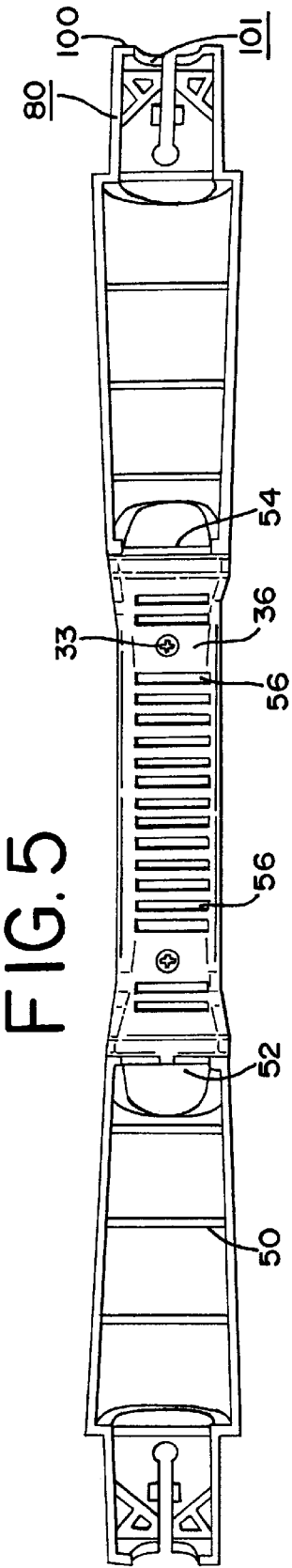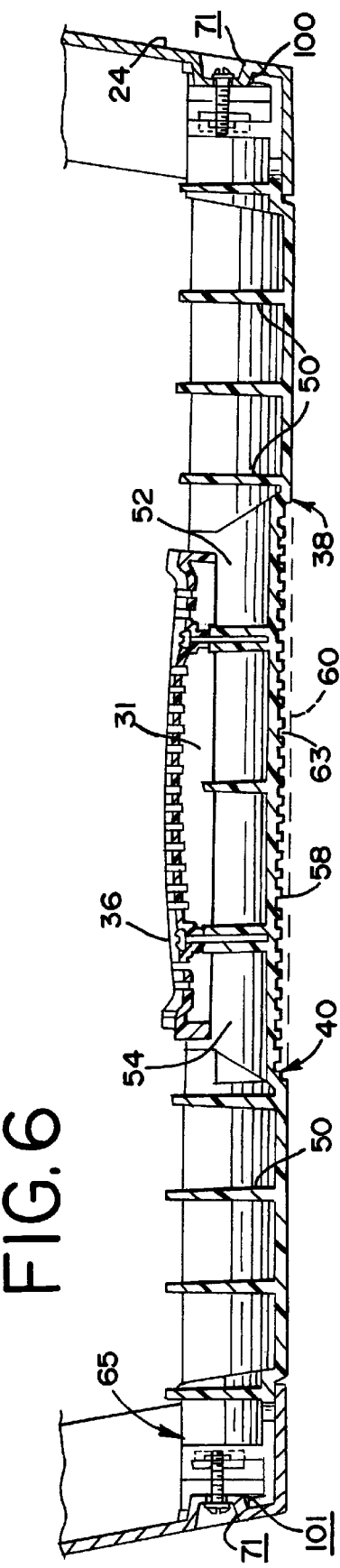

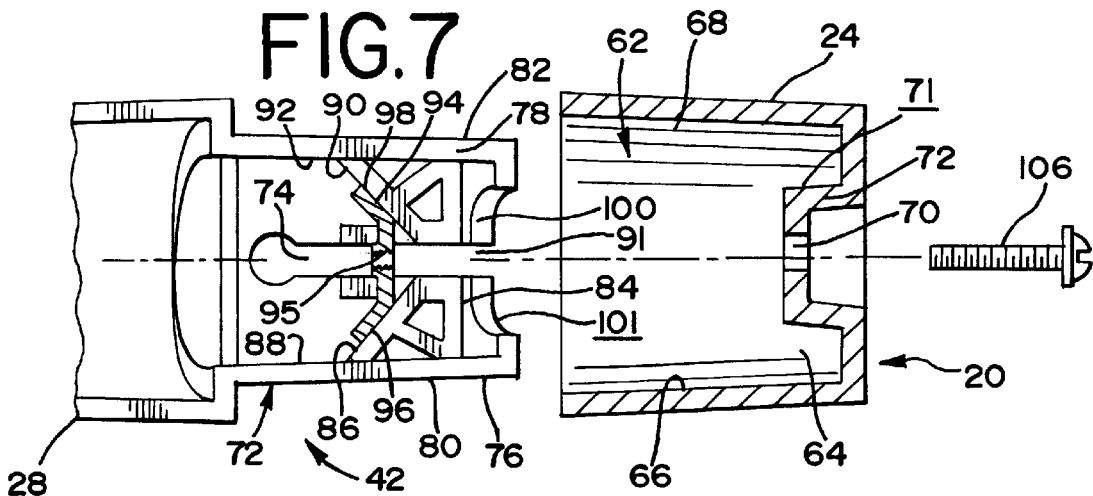
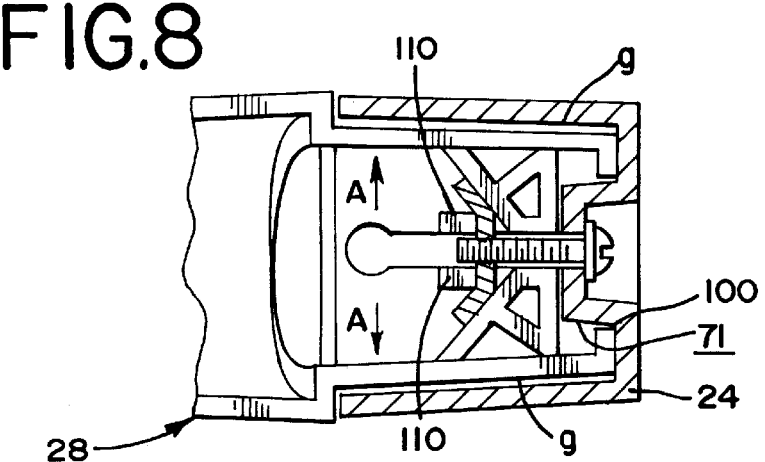
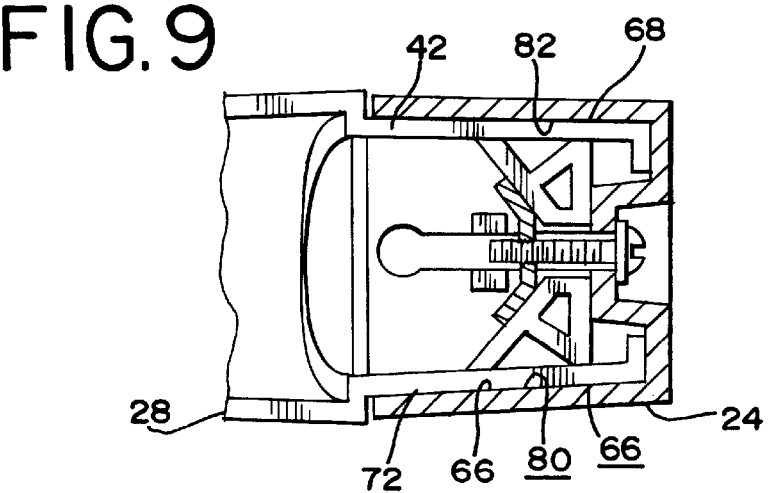

HANDLE FOR A BARBECUE GRILL

DESCRIPTION

1. Technical Field

The present invention generally relates to barbecue grills used for outdoor cooking, and particularly to a handle that is connected to a lid of a gas barbecue grill.

2. Background of the Invention

Grills have been used for many years as outdoor cooking devices. Gas grills, in particular, have become increasingly popular.

Gas barbecue grills may be stationary or portable. Portable gas grills generally comprise a cart, supported on wheels, and a cooking vessel supported by the cart. The cooking vessel generally comprises a base and a lid. The base supports gas burners and a grid that supports heat conductive material such as lava rock or metal conductive members, such as is disclosed in U.S. Pat. No. 4,727,853. A cooking grid is positioned above and spaced from the conductive material. A portable fuel tank is also supported on the cart and supplies fuel, such as propane, to the gas burners which supply heat. The lid is constructed to cover the base and can be hingedly, or pivotally attached to the base.

The lid has a handle used to upwardly tilt the lid to provide access to the cooking grid and base. The lid is typically a single piece of cast aluminum. In another form, however, the lid can comprise first and second side support members that are made from cast aluminum and a separate metal sheet that is attached between the first and second side support members. A popular design of this arrangement has the distinctive lid appearance of the grill sold under the name Genesis®, by Weber-Stephen Products Co. The handle can be made from many different materials including plastic, wood or metal.

Because of the close proximity of the handle to the cooking vessel, the handle can become hot due to heat transfer from the cooking vessel. Thus, a user may grasp the handle that is hot and experience discomfort. Further, excessive heating of the handle may cause wear or discoloration of the handle.

Problems also may be experienced with providing efficient securement of the handle to the lid. As discussed, the lid is typically formed from cast aluminum that has minimal elasticity qualities and may be brittle when subject to forces of threaded fasteners. Also attaching a plastic handle to the cast lid, the material properties of the respective pieces make it difficult to provide a lasting secure fit. Thus, over time, the attachments between the handle and the lid may loosen. Such factors may lower overall user satisfaction of the grill.

The present invention is provided to solve these and other problems.

SUMMARY OF THE INVENTION

The present invention is directed to a grill used for outdoor cooking. According to a first aspect of the invention, a handle of a grill comprises a gripping portion defining an inner chamber therein. The gripping portion has a passageway in fluid communication with the inner chamber and the atmosphere, thus venting the handle to prevent overheating.

According to a further aspect of the invention, the gripping portion has a first end, and the passageway is located at the first end. The gripping portion may also have a second end wherein a second passageway is located at the second end.

According to another aspect of the invention, the gripping portion comprises a curved wall defining the inner chamber therein. The curved wall is a U-shaped wall and further has a joining wall connected to the U-shaped wall. The joining wall has a slot in fluid communication with the inner chamber and the atmosphere. A plurality of slots could also be utilized.

According to a further aspect of the invention, the curved wall of the gripping portion has an outer surface. The outer surface has a plurality of raised projections, spaced from one another. A metal sheet is optionally connected to the outer surface of the gripping portion.

According to yet another aspect of the invention, a handle assembly is connected to a lid of the grill. The lid has a support member having a sleeve having an inner surface. The handle assembly has a gripping portion having an end. An expansion member is connected to the end and is adapted to be received by the sleeve. The expansion member has an expansion wall having an outer surface. The expansion wall is adapted to be expanded outwardly by a manipulating force, wherein the outer surface of the expansion wall engages the inner surface of the sleeve to securely connect the handle to the lid.

Other features and advantages of the invention will be apparent from the following detailed description taken in conjunction with the following drawings.

BRIEF DESCRIPTION OF THE DRAWINGS

FIG. 4 is a front elevational view of the handle;

FIG. 5 is a rear elevational view of the handle;

FIG. 6 is a cross-sectional view of the handle taken along lines 6—6 of FIG. 1;

FIG. 7 is an partial exploded view of an expansion member of the handle and a sleeve of the lid;

FIG. 8 is a partial cross-sectional view of the expansion member inserted into the sleeve of the lid taken along lines 9—9 of FIG. 1; and FIG. 9 is a partial cross-sectional view of the expansion member and the sleeve, taken along lines 9—9 of FIG. 1, with the expansion member shown in an expanded position.

DETAILED DESCRIPTION

Figure 1:
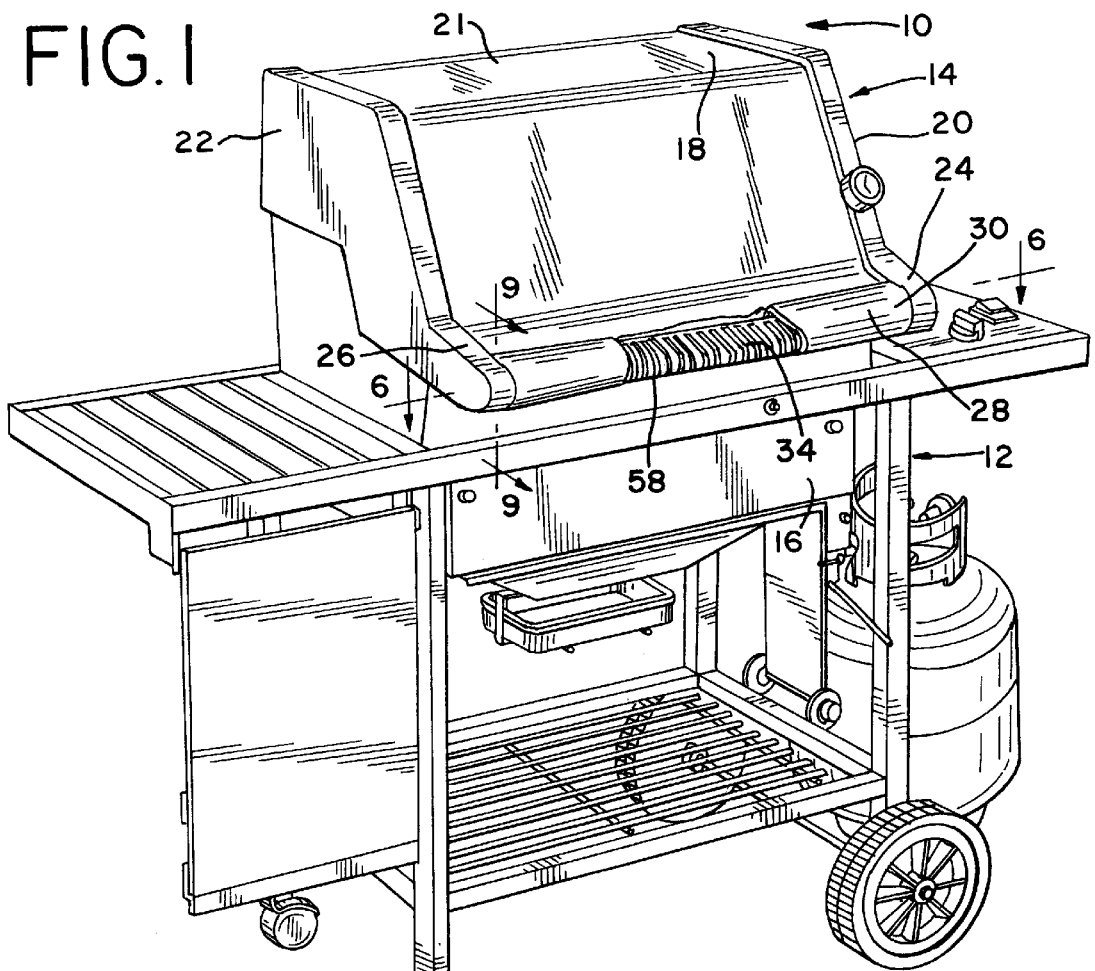
FIG. 1 is a perspective view of a gas grill constructed in accordance with the present invention.
Figure 2:
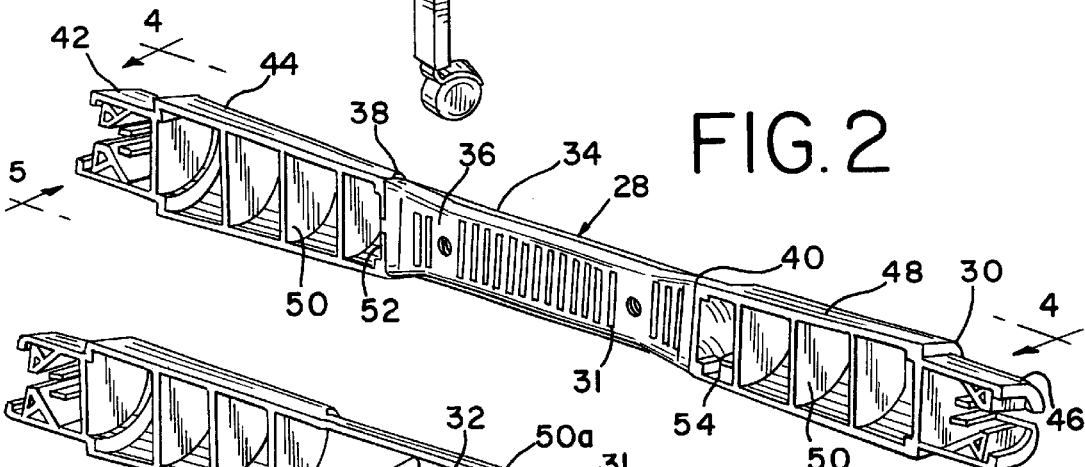
FIG. 2 is a rear perspective view of a handle of a lid of the grill.
Figure 3:
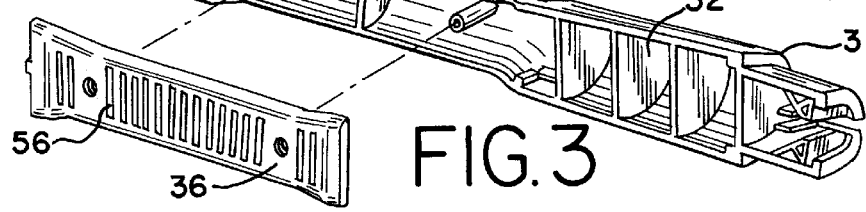
FIG. 3 is an exploded rear perspective view of a handle of FIG. 2.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to the drawings, FIG. 1 shows a perspective view of a gas grill generally designated by the reference numeral 10, and constructed in accordance with the present invention. The gas grill 10 generally comprises a support frame 12 and a cooking vessel 14. The cooking vessel 14 generally comprises a base 16 and a lid 18. The lid 18 generally has a first side support member 20 and a second side support member 22, and a generally planar member 21 between the support members 20,22. Alternatively, the lid 18 could be of one-piece construction or of multiple-piece construction such as is shown. As further shown in FIG. 1, the first side support member 20 has a first sleeve 24 extending towards the second side support member 22. Similarly, the second side support member 22 has a second sleeve 26 extending towards the first side support member 20. A handle 28 is connected between the side support members 20,22. As explained in greater detail below, end portions of the handle 28 are received by the sleeves 24,26.

FIGS. 2–9 show the handle 28 in greater detail. The handle 28 has a unique venting structure that prevents overheating. The handle 28 and side support members 20,22 of the lid 18 have unique cooperating, connecting structure that provides a secure connection between the handle 28 and the lid 18. The venting structure of the handle 28 will first be described and then the connecting structure of the handle 28 and side support members 20,22 will be described.

As shown in FIGS. 2–6, the handle 28 is preferably an elongated, U-shaped member that extends between the side support members 20,22 of the lid 18. Thus, the handle 28 generally has a curved or segmented outer wall 30 having an open end 32. The U-shaped outer wall 30, preferably comprises a curved section and a pair of confronting walls. The handle 28 has a gripping portion 34, preferably in the central region of the handle 28, that has a cover in the form of a generally planar joining wall 36 connected to the outer wall 30, thus defining an inner chamber 31 therein. When a user grasps the gripping portion, the fingers curl around the gripping portion and contact the joining wall 36. While in a preferred embodiment the outer wall 30 is U-shaped, the outer wall 30 could take other curved or non-curved forms. In addition. it is understood that the outer wall 30 and joining wall 36 could be integrally constructed, and the joining wall 36 may not be generally planar but may be curvilinear or of another shape. In a preferred embodiment, however, the joining wall 36 is a separate piece that is fastened to the outer wall 30 by screws 33 (FIG. 5). The joining wall 36 could be fastened by other methods such as resilient tabs or other projection/receiver members.

As further shown in FIGS. 2–6, the gripping portion 34 has a first end 38 and a second end 40. A first expansion member 42 is connected to the first end 38 preferably via a first intermediate member 44. A second expansion member 46 is connected to the second end 40 preferably via a second intermediate member 48. It is understood that the gripping portion 34 could be lengthened wherein the intermediate members 44,48 are eliminated. Additional portions could also be added depending on the desired length or shape of the handle 28. Also in a preferred embodiment, the intermediate portions 44,48 have ribs 50 between the confronting walls to enhance the structural rigidity of the handle 28. In the preferred embodiment, the outer wall 30 at the intermediate members 44,48 is flared outwardly wherein it has a greater outer dimension than the gripping portion 34.

As discussed, the gripping portion 34 defines the inner chamber 31. The gripping portion 34 has a first passageway 52 in fluid communication with the inner chamber 31 and the atmosphere. The first passageway 52 thus provides a vent for the inner chamber 31 of the gripping portion 34. Because of the heat generated in the cooking vessel, the handle 28 including the gripping portion 34 can become quite hot. The passageway 52 provides a vent that prevents the gripping portion 34 from becoming overheated. In a preferred embodiment, the first passageway 52 is located at the first end 38 of the gripping portion 34 and faces towards the first expansion member 42. One of the ribs 50 can be positioned proximate the passageway 52 to provide support and direct airflow away from the handle 28.

Also in a preferred embodiment and as further shown in FIGS. 2–6, a second passageway 54 is provided at the second end 40 of the gripping portion 34 and facing towards the second expansion member 46. In this embodiment, the gripping portion 38 may be divided by a central support rib 50a for added strength and resistance to deformation, without compromising desired cooling by air flow through the gripping portion 34. In addition, the joining wall 36 has a plurality of slots 56 that are in fluid communication with the inner chamber 31 and the atmosphere. The passageways 52,54 and slots 56 cooperate to vent the inner chamber 31 of the gripping portion 34 to prevent overheating. Thus, a user can grasp the gripping portion 34 of the handle 28 without concern of retained heat of the handle 28.

As further shown in FIGS. 1, 4 and 6, the outer wall 30 at the gripping portion 34 has a plurality of raised projections 58, spaced from one another. If desired, a cart 60 (FIG. 6) (shown in phantom) can be wrapped around the outer wall 30 at the gripping portion 34. The raised projections 58 provide gaps 63 between the gripping portion 34 and the cover 60. The gaps 63 provide an insulation between the cover and the outer wall 30 to prevent excessive heat transfer to the cover 60. The cover 60 may be formed of steel or aluminum sheet stock, or may be an added molded plastic member. The detachable securement of the joining wall 36 provides a convenient structure for securing opposed edges of the cover 60 to the gripping portion 34 by the opposed edges fitting into the connection between the joining wall 36 and the outer wall 30.

FIGS. 4–9 disclose the expansion members 42,46 in greater detail. It is understood that in a preferred embodiment, the handle is symmetrical along its longitudinal axis and thus, the structure of the handle 28 on each side of the gripping portion 34 is generally similar or is essentially identical. The structure of the first expansion member 42 will be described in detail with the understanding that the second expansion member 46 has similar structure. Similarly, the respective connections of the expansion members 42,46 and the side support members 20,22 are identical and, therefore, only one connection will be described.

As shown in FIGS. 6 and 7, the first expansion member 42 is adapted to be received by the first sleeve 24 of the first side support member 20. The sleeve 24 preferably is generally cylindrical and faces towards the second side support member 22. The sleeve 24 has a linear extent 62 to receive first expansion member 42. In the preferred embodiment, the sleeve 24 has a curved inner wall 64. Alternatively, the sleeve may be of some other configuration, with generally opposed wall surfaces 66,68. As shown in FIG. 7, the inner wall 64 has a first curvilinear inner surface 66 and a generally opposed second curvilinear inner surface 68. The sleeve 24 further has an opening 70 providing a passageway into the inner extent 62, to receive a screw 106 or other biasing member, described in greater detail below.

As further shown in FIG. 7, the first expansion member 42 generally has an expansion wall 72. The expansion wall is shaped generally corresponding to the shape of the sleeve inner wall 64. The expansion wall 72 has a slot 74 thus dividing the wall 72 into two sections, a first leg 76 and a second leg 78. The first leg 76 has a first outer surface 80 and the second leg has a second outer surface 82. The outer surfaces 80,82 collectively define the outer surface of the expansion wall 72.

The first expansion member 42 further has a spreader member 84 used to expand the expansion wall 72 of the expansion member 42 into engagement with the sleeve 24.

The spreader member 84 generally comprises a first inclined surface 86 extending from an inner surface 88 of the first leg 76 and a second inclined surface 90 extending from an inner surface 92 of the second leg 78. The inclined surfaces 86,90 converge towards one another. A channel 91, however, is maintained between the inclined surfaces 86,90. The first expansion member 42 further has an end flange 100 also U-shaped into a receiver. It is understood that the second extension member 46 has identical structure to that just described.

As will be described in greater detail below, to connect the handle 28 to the lid 18, a fastener 94 is provided having a threaded opening 95 and a pair of inclined surfaces 96,98 that generally correspond to the inclined surfaces 86,90 of the spreader member 84.

FIGS. 7–9 show how the handle 28 is securely connected to the lid 18. The connection at one end of the handle 28 and first side support frame 20 will be described with the understanding that the connection at the other end of the handle 28 is identical. As shown in FIG. 7, the first expansion member 42 is received by the first sleeve 24 into the inner extent 62 of the sleeve 24. In this configuration, the outer surface of the expansion wall 72 confronts the inner wall 64 of the sleeve 24. A gap "g" (FIG. 8) may be present between the expansion wall 72 and the sleeve 24. The end flange 100 has a transverse surface 101 that is adapted to abut a stop surface 71 on the countersunk opening 70 of the sleeve 24 to prevent the handle 28 from coming out of the sleeve 24 towards the cooking vessel 14. In the preferred embodiment, where the sleeve 24 has an open side 65 of the inner wall 64, the mating relationship of the surface 101 against the stop surface 71 prevents the handle from the sleeve 24 when the expansion member 42 is manipulated to expand into secured arrangement. It should be understood that this arrangement of mating surfaces on a projection 72 and an opposed surface 101 may be inverted.

As shown in FIG. 7, the fastener 94 is placed on the spreader member 84 with the threaded opening 95 positioned aligned with the channel 91. The inclined surfaces 96,98 of the fastener 94 confront the inclined surfaces 86,90 of the spreader member 84. As shown in FIG. 8, a screw or other biasing member 106 is provided to manipulate the fastener 94 to separate the spreader member 84. The screw 106 is inserted through the opening 70 and into the threaded opening 95 of the fastener 94. A pair of elongated projections 110 are positioned above the inclined surfaces 96,98 and provide an additional guide for the screw 106. Initially, as shown in FIG. 8, the gap "g" may still be present. The screw 106 is further threaded into the opening 95 pulling the fastener 94 along the screw 106. The inclined surfaces 96,98 of the fastener 94 move along the incline surfaces 86,90 of the spreader member 84. As such, the expansion member 42 is biased, or expanded outwardly towards the inner wall 64 of the sleeve 24 (see arrows A in FIG. 8). As shown in FIG. 9, the expansion wall 72 is urged against and into engagement with generally opposed segments of the inner surface 66 of the sleeve 24. Specifically, the first leg 76 and second leg 78 are expanded outwardly wherein the first outer surface 80 engages the first inner surface 66 and the second outer surface 82 engages the second inner surface 68. The screw 106 is inserted until a sufficient engagement is achieved between the surfaces thus resulting in a secure frictional fit between the expansion member 42 and the sleeve 24. The handle 28, therefore, is securely connected to the lid 18.

As can be appreciated by FIGS. 1 and 6, the sleeve 24 has an open end 65 towards the rear of the lid 18, such as by an open segment of the wall surface 66. Because the expansion member 42 is being outwardly expanded, there may be a tendency for the member 42, and therefore the handle 28, to gradually move towards the open end 65 of the sleeve 24, and potentially be propelled from the sleeve 24. The countersunk opening 70, or projection, and the end flange 100, or receiver, however, prevent movement of the expansion member 42 out of the sleeve 24 towards its open end 65. Specifically, the end flange 100 has a surface 101 that engages a stop surface 71 on the countersunk opening 70 (FIGS. 6 and 8). It is understood that these engaging surfaces could be reversed such as by providing a recess in the sleeve 24 to receive a projection on the expansion member 42. Thus, there is engagement between a projection and a receiver, wherein the projection is positioned on either the sleeve 24 or the expansion member 42 and the receiver is located on the other of either the sleeve or the expansion member 42. Alternatively, the sleeve 24 may have a continuous wall without an open side 65, thereby preventing movement transverse to the handle length. In such an embodiment, the expansion member 42 may have additional plurality of legs 76,78 adapted to engage with other opposed segments of the wall surface 66.

FIGS. 7–9 disclose preferred methods to bias or expand the expansion member 42 into engagement with the inner wall 64 of the sleeve 24. Expansion structure could also be directly connected between the first leg 76 and second leg 78. Springs or other biasing structure could also be utilized.

While the specific embodiments have been illustrated and described, numerous modifications come to mind without significantly departing from the spirit of the invention and the scope of protection is only limited by the scope of the accompanying Claims.

We claim:

1. A handle for a barbecue grill, comprising, a handle body having a gripping portion with an inner chamber having a passageway in fluid communication with the atmosphere, said passageway being comprised of a first opening adjacent said gripping portion, and wherein the handle is secured to a barbecue grill by insertion of an expansion member of said handle into a mating sleeve of said grill, the expansion member having an expansion wall adapted to be forced into fixed engagement with said sleeve.

2. The handle of claim 1 wherein, the handle is made of plastic.

3. A handle assembly for a barbecue grill having a lid, the lid having a support member with a first and second sleeve, each sleeve having an inner surface, the handle assembly adapted to be connected to the lid, the handle assembly comprising:

a first end and a generally opposed second end, the first end having a first expansion member adapted to be received by the first sleeve, the first expansion member having an expansion wall having an outer surface, wherein the expansion wall is adapted to be expanded outwardly wherein the outer surface of the expansion wall is adapted to engage the inner surface of the sleeve and being biased against said inner surface to attach the first end to said sleeve;

the second end having a second expansion member adapted to be received by the second sleeve, the second expansion member having an expansion wall having an outer surface, wherein the expansion wall is adapted to be expanded outwardly wherein the outer surface of the expansion wall is adapted to engage the inner surface of the second sleeve to attach said second to said sleeve;

said attachment of the first and second end of the handle adapted to maintain said handle in fixed relation to said lid.

4. The handle assembly of claim 3 wherein, the expansion wall has a first leg and a second leg separated by a gap, wherein the outer surface has a first outer surface on the first leg and a second outer surface on the second leg, and wherein the legs are adapted to be mechanically forced outwardly and in generally opposed directions by expanding said gap such that the outer surfaces of the first and second legs are adapted to frictionally engage generally opposed inner surfaces of the sleeve.

5. The assembly of claim 4, further comprising, a spreader member positioned at a terminal end of said first end and being adapted to be forced against said expansion member to expand said gap and force said expansion wall in fixed engagement with the inner surface of the sleeve.

6. The assembly of claim 4, wherein the outer surface of said first and second legs are flat and substantially mate with generally smooth inner surfaces of said first and second sleeves.

7. A handle assembly for a barbecue grill having a lid, the lid having a support member with a sleeve, the sleeve having an inner surface, the handle assembly adapted to be connected to the lid, the handle assembly comprising:

a gripping portion having an end; and an expansion member connected to the end and adapted to be received by the sleeve, the expansion member having an expansion wall having an outer surface, wherein the expansion wall is adapted to be expanded outwardly wherein the outer surface of the expansion wall is adapted to engage the inner surface of the sleeve;

wherein the expansion member has a spreader member mounted at a terminal end of the expansion member and adapted to be forced against the expansion member to outwardly expand the expansion wall into fixed engagement with the inner surface of the sleeve by movement of the expansion member relative to the sleeve.

8. The assembly of claim 7, wherein, the spreader member includes a generally V-shaped spreader surface adapted to be forced against generally opposed surfaces of the terminal end of the expansion member to urge said expansion wall outwardly.

9. A lid for a barbecue grill comprising:

a first side support member having a first sleeve having an inner surface;

a second side support member having a second sleeve having an inner surface;

a handle having a gripping portion having a first end and a second end, the handle further having a first expansion member positioned at a terminal portion of the first end and a second expansion member positioned at a terminal portion of the second end; and the first expansion member being urged against and into fixed engagement with the inner surface of the first sleeve and the second expansion member being urged against and into fixed engagement with the inner surface of the second sleeve, said first and second expansion members each being urged in fixed engagement by cooperation of a spreader member being forced against a terminal portion of each said first and second ends.

10. A barbecue grill comprising:

a support frame supporting a base thereon and a lid pivotally attached to the base, the lid having a first sleeve and a second sleeve, the first sleeve having a first inner surface and the second sleeve having a second inner surface;

a handle having gripping portion with a first end and a second end, the gripping portion defining an inner chamber, the gripping portion further having a passageway in fluid communication with the inner chamber and the atmosphere, the handle further having a first expansion member having a first outer surface and being received by the first sleeve and a second expansion member having a second outer surface and being received by the second sleeve; and means for biasing the expansion members wherein the first outer surface engages the inner surface of the first sleeve and the second outer surface engages the inner surface of the second sleeve.

* * * * *